United States Patent [19]

Harris

[11] Patent Number: 4,882,552
[45] Date of Patent: Nov. 21, 1989

[54] COHERENT FREQUENCY EXCHANGE KEYING MODULATOR

[75] Inventor: Robert M. Harris, Aldershot, England

[73] Assignee: The Secretary of State of or Defence in Her Britannic Majesty's Government of The United Kingdom of Great Britain and Northern Ireland, London, England

[21] Appl. No.: 296,243

[22] Filed: Jan. 12, 1989

[30] Foreign Application Priority Data

Jan. 20, 1988 [GB] United Kingdom ............... 8801259

[51] Int. Cl.$^4$ ............................................. H04L 27/12
[52] U.S. Cl. ..................................... 332/100; 375/45; 375/66
[58] Field of Search ............ 332/9 R, 10, 16 R, 23 R, 332/23 A; 375/44, 45, 47, 62, 64, 66; 455/42, 110

[56] References Cited

U.S. PATENT DOCUMENTS 3,223,925 12/1965 Florac, Jr. et al. .................. 375/66
4,516,087 5/1985 Bruene ......................... 332/23 A X Primary Examiner—Siegfried H. Grimm
Attorney, Agent, or Firm—Nixon & Vanderhye

[57] ABSTRACT

Signal modulation apparatus for the transmission of binary data signals embodying a process which results in superior side-lobe suppression compared with other forms of modulation such as frequency shift keying. The apparatus generates two carrier waves, the difference between whose frequencies is an integral multiple of the data signal bit-rate, amplitude modulates the two waves by a low-pass filtered data signal and an inverted version thereof respectively and then sums the resulting modulated waveforms to produce a frequency keyed waveform having continuous phase and almost negligible envelope ripple. The apparatus can be used with most forms of digital communication systems and may be demodulated by a conventional receiver such as ratio detector or phase-locked loop.

5 Claims, 3 Drawing Sheets

COHERENT FREQUENCY EXCHANGE KEYING MODULATOR

This invention relates to modulation processes suitable for the transmission of digital information over radio links. When designing modulators for digital signal transmission two important factors emerge: viz the occupied bandwidth of the transmitted signal and its envelope characteristics in the time domain. As the radio spectrum becomes more and more congested it becomes advantageous to reduce the spectral side lobes introduced by any modulation process which could cause interference in adjacent radio channels. Pure analogue frequency modulation (FM) is bad in this respect as even with careful filtering and shaping of the modulation pulses, the nature of FM gives rise to an unlimited number of sidebands at harmonics of the dominant modulation frequency. However, the envelope constancy of FM, preferred for power amplification, is one reason why this process is widely used.

An alternative modulation process known as binary frequency exchange keying (FEK), where two carriers are keyed in complementary fashion, can have superior spectral containment provided the keying pulses are sufficiently band-limited. However, the waveform, in general, will be discontinuous and subject to deep notches at the transitions from one carrier to another.

The discontinuity in waveform may be eliminated by employing the technique of continuous phase frequency shift keying (FSK), the modulated waveform being generated by applying a bipolar digital signal to a voltage-controlled oscillator. Good spectral containment can be achieved by this method especially in the case where the frequency difference between carriers is made equal to half the bit-rate of the digital signal, sometimes known as minimum shift keying (MSK).

This invention seeks to provide modulation apparatus which achieves better spectral containment than that which employs an MSK process and, at the same time, achieves a modulated envelope constancy comparable with that achievable by a pure analogue FM process.

The invention consists of signal modulation apparatus for the transmission of a binary data signal comprising means for filtering the binary data signal to produce a base-band signal, means for generating two carrier waves, the difference between whose frequencies is substantially an integral multiple of the bit-rate of the binary data signal, means for amplitude modulating the two carrier waves by the base-band signal and an inverted version thereof respectively and means for adding the two amplitude-modulated carrier waves to produce a frequency-modulated waveform.

Preferably, the frequencies of the carrier waves are chosen to be substantially greater than the bit-rate of the binary data signal so that the envelope of the amplitude modulated signal has the same shape as the base-band signal.

If the difference between carrier wave frequencies is exactly an integral multiple of the bit-rate, then the two carrier waves can be made to have exactly the same phase at each transition of the binary data signal and hence good phase continuity and small envelope ripple is ensured. Preferably, the frequency difference is chosen to equal the bit-rate.

Preferably, the filtering means is a low-pass filter having a transfer function whose gain and phase components are such that inter-symbol interference is minimal and having a sharp cut-off beyond its 3 dB frequency.

For example, a 3-pole, 6th-order Butterworth filter having a 3 dB frequency substantially equal to the bit-rate would be an appropriate choice.

Apparatus in accordance with the invention performs a process which is similar to FEK in that it effects a change from one signalling condition to another which is accompanied by a decay in amplitude of one carrier wave and an increase in amplitude of another. The process will be referred to hereinafter as coherent frequency exchange keying (CFEK).

A transmitter comprising this apparatus is simple to construct and easy to miniaturise as no RF filtering is necessary. Conventional de-modulation techniques can be employed. For example any type of frequency discriminator such as a ratio detector or phase-locked-loop may be employed.

An embodiment of the invention will now be described, by way of example only, with reference to the following drawings of which:

Figure 1:
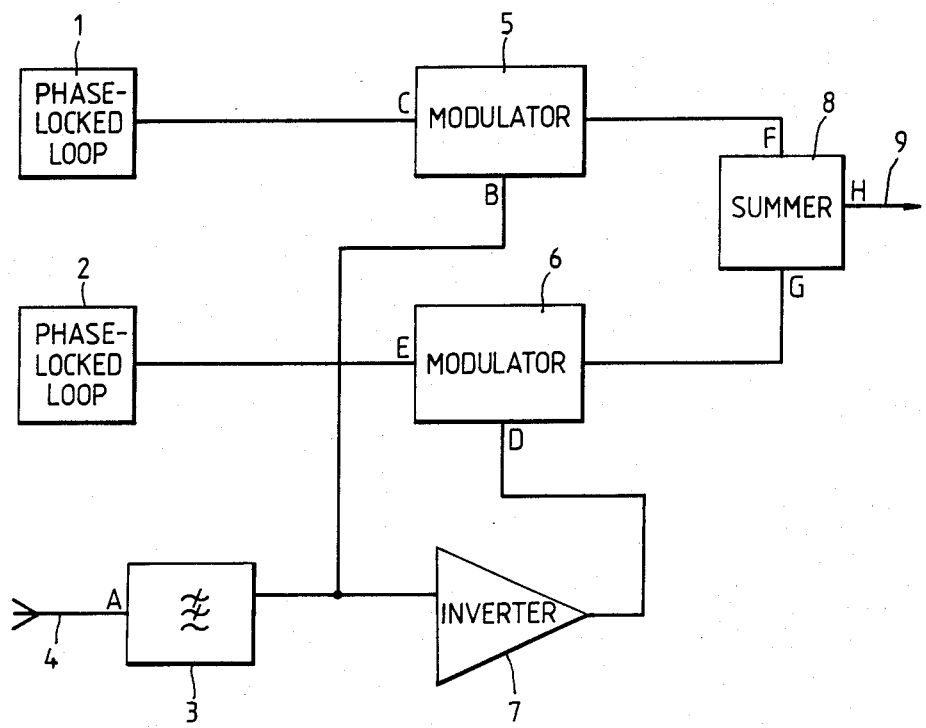
FIG. 1 is a schematic block diagram of signal modulation apparatus in accordance with the invention.

Referring to FIG. 1, two carrier waves are generated by two phase-locked loops 1 and 2 which are both locked to a common frequency reference (not shown). A 6th order Butterworth low-pass filter 3 receives a binary data signal on line 4. Each carrier wave is amplitude modulated by one of two linear amplitude modulators 5 and 6, the modulating base-band signal for the modulator 5 being the output from the Butterworth filter 3. The Butterworth filter output is inverted by an inverter 7 before being applied to the modulator 6. A summer 8 adds the two amplitude modulated waveforms together to produce a coherent frequency exchange keyed waveform on line 9. The 3 dB frequency of the Butterworth filter 3 is chosen to equal the bit rate of the binary data signal.

Figure 2:
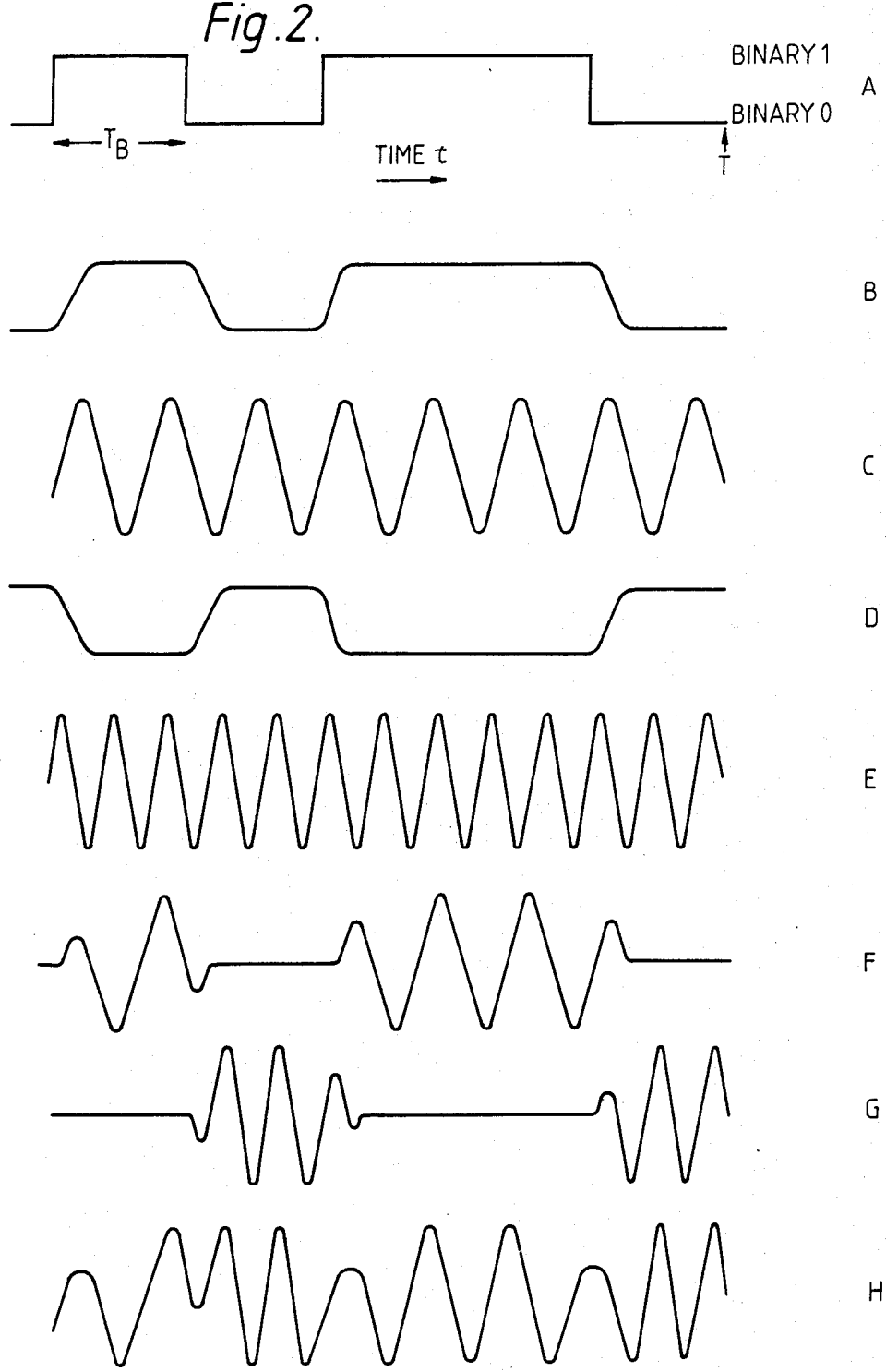
FIG. 2 shows signal waveforms which appear at the various output stages of FIG. 1.

FIG. 2 shows examples of waveforms which appear at the correspondingly labelled inputs and output of the apparatus shown schematically in FIG. 1. An on-off binary signal (A) is shown having a bit rate of $1/T_B$. The two carrier waveforms (shown at C and E) would, in general, have frequencies much higher than the bit rate of the binary signal. In FIG. 2 however the number of cycles occurring within a bit-period has been much reduced for clarity. For the same reason, envelope ripple is also exaggerated. In this example, the frequency difference between carrier waves is equal to the bit rate. As can be seen from inspection of the waveforms shown, this ensures continuity of phase at the frequency change-over points and minimum envelope ripple of the output waveform appearing at H.

Figure 3:
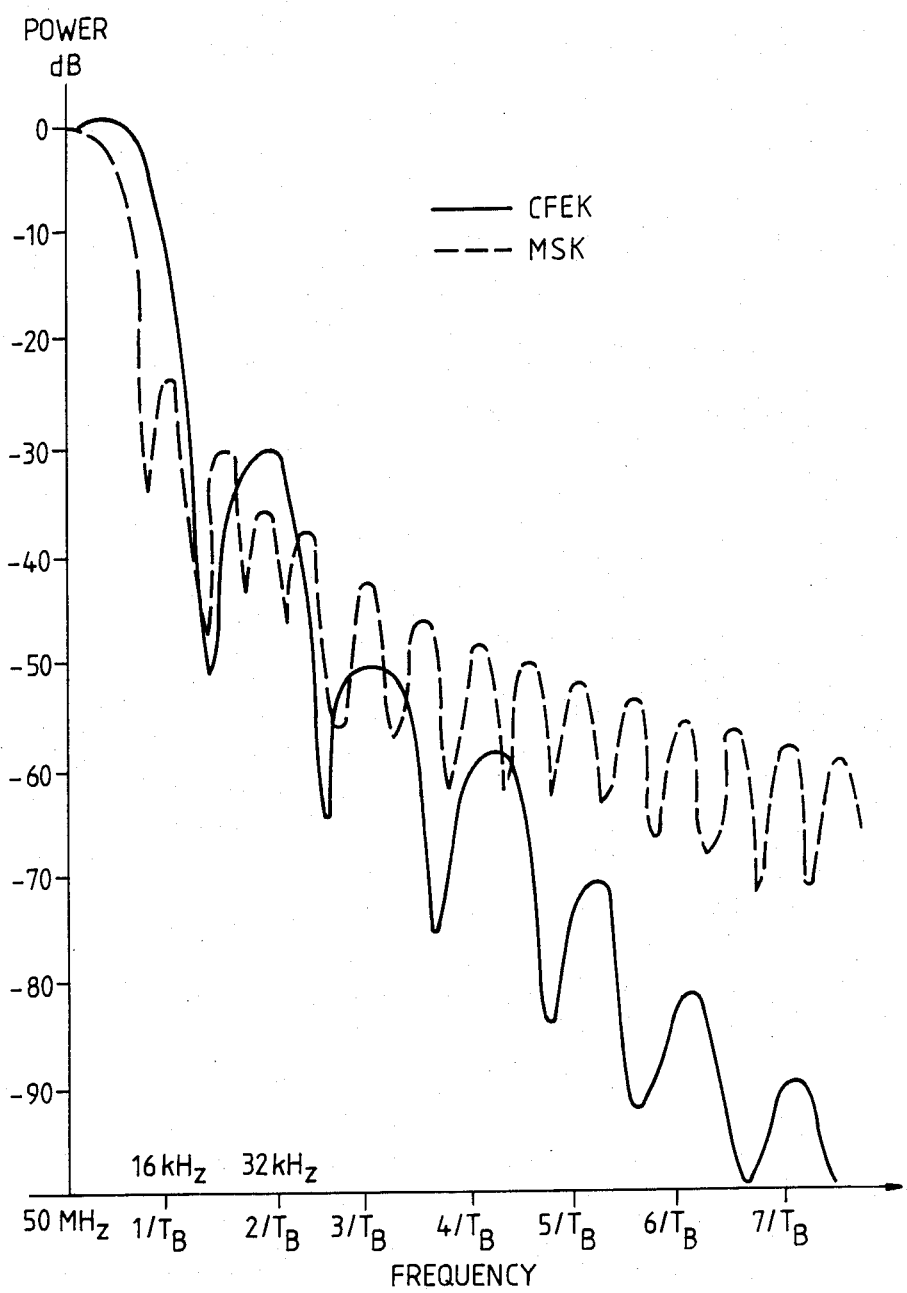
FIG. 3 shows a comparison of CFEK and MSK spectra.

FIG. 3 shows the spectral envelopes of a CFEK modulated wave and an MSK modulated wave. The two spectra have been normalised to the same equivalent carrier power and superimposed. The spectra were both generated using a digital signal from a 2047-bit pseudo-random sequence generator with a bit-rate of 16 kHz. The carrier wave frequencies were 50 MHz±8 kHz. The main lobes of both spectra are almost co-incident but successive side-lobes are more and more attenuated in the case of CFEK. Examination of the CFEK signal in the time-domain revealed an envelope ripple of 1.25 dB.

While the spectrum corresponding to specific values of carrier frequencies and bit-rate has been presented in FIG. 3 it will be appreciated that the invention will perform in a similar fashion at other carrier frequencies and bit rates and exhibit the same superior performance in side-lobe suppression compared with an MSK process.

I claim:

1. Signal modulation apparatus for the transmission of a binary data signal consisting of means for filtering the binary data signal to produce a base-band signal, means for generating two carrier waves the difference between whose frequencies is substantially an integral multiple of the bit-rate of the binary data signal, means for amplitude modulating the two carrier waves by the base-band signal and an inverted version thereof respectively and means for adding the two amplitude-modulated carrier waves to produce a frequency-modulated waveform.

2. Signal modulation apparatus as claimed in claim 1 in which the means for filtering the binary data signal is a low-pass filter having a transfer function whose gain and phase components are such that inter-symbol interference is minimal and having a sharp cut off beyond its 3 dB frequency.

3. Signal modulation apparatus as claimed in claim 1 in which the means for filtering the binary data signal is a high order, low-pass Butterworth filter.

4. Signal modulation apparatus as claimed in claim 2 in which the 3 dB frequency of the low-pass filter is substantially equal to the bit-rate of the binary data signal.

5. Signal modulation apparatus as claimed in claim 1 in which the difference between carrier wave frequencies is substantially equal to the bit-rate.

* * * * *